Jan. 25, 1955 N. C. SLYKER 2,700,300
PRECISION SHEAR JIG
Filed Nov. 2, 1953
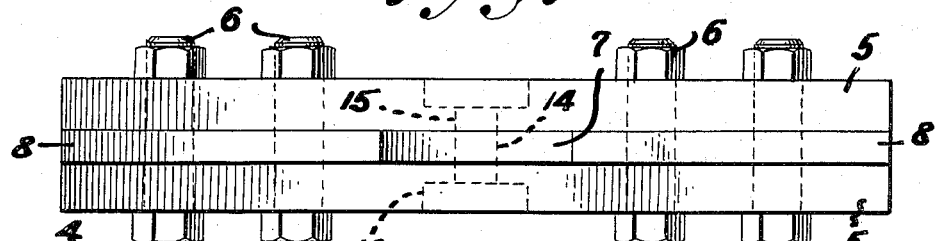
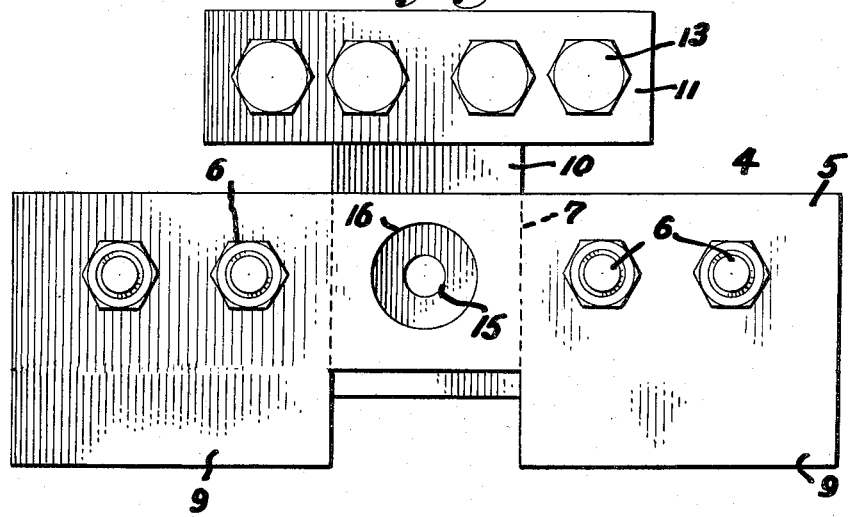
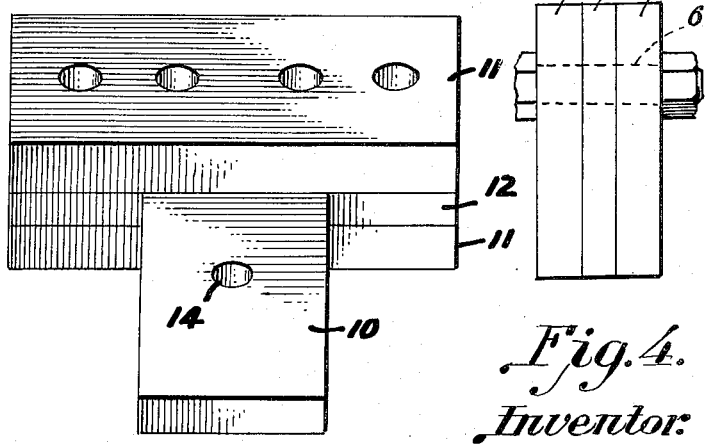
Inventor:
NELLIE C. SLYKER
By Dwight R. Bean
Atty.

United States Patent Office 2,700,300
Patented Jan. 25, 1955

2,700,300

PRECISION SHEAR JIG

Nellie C. Slyker, Evansville, Ind.

Application November 2, 1953, Serial No. 389,737

3 Claims. (Cl. 73—103)

This invention is a shear jig directed to means of simplified nature for determining resistance against shearing stresses of rivets, bolts, rods or other devices used generally, though not exclusively, in assembly structures.

The primary object of the invention is to provide a jig of simplified construction, for use in connection with standard testing machines, which permits of ready application thereto of the material to be tested, and which may be quickly applied to the testing machine to accurately determine the shear strength of the material.

A further object of the invention is to provide a shear jig particularly for determining the shearing strength of rivets, wherein the rivets to be tested may be quickly and easily applied to the jig and the jig readily applied to the standard testing machine without the exercise of special skill or knowledge, and wherein the jig operates in such manner as to accurately register upon the machine the shear stress of the rivet applied thereto.

A further object of the invention is to provide a jig of such construction that the rivet may be easily and quickly applied thereto for accurate determination of the shearing stresses, the construction of the jig preventing any possibility of a diagonal or slanting shearing action or bending of the rivet during the shearing operation as has been the case with other shearing devices heretofore proposed.

With the foregoing objects in view, together with others which will appear as the description proceeds, the invention consists in the novel construction, combination and arrangement of parts, all as will be described more fully hereinafter, illustrated in the drawings, and particularly pointed out in the claims.

In the drawings:

Fig. 1 is a top plan view of the shear jig body with the sliding plunger removed, Fig. 2 is a side elevation of the jig body showing the plunger inserted therein, Fig. 3 is a perspective view of the plunger member removed from the jig body, and Fig. 4 is an end elevation of the shear jig body with the plunger removed.

In the assembly of multi-part structures such as airplanes, it is imperative that the connecting elements, such as rivets or bolts be assured of withstanding the resistance to which they must necessarily be subjected when the structure is in use or operation. It is the practice, therefore, in the assembly processes to periodically test these connecting elements, usually by selecting them at random, to determine if their resistance against shearing stresses measure up to specification. Devices heretofore proposed for determining the shear strength of rivets, bolts, pins, etc. have not proved entirely satisfactory and dependable, being usually single shear devices and thus more or less inaccurate. This is due to the fact that the rivet or other device being tested tends to bend during the shearing operation, resulting in a diagonal shearing surface and thus not representing the true shearing strength of the material under test. In other instances where double shear jigs have been utilized, much time has been lost in bringing the upper and lower plates of the testing machine into such position as to align the holes or openings in order that the rivet or pin may be inserted. Moreover, the double shear jigs heretofore proposed have been of such character and are associated with the testing machine in such manner as to require precision operation usually carried out by those possessing more or less skill in the operation of such machines. As has been pointed out, the principal object of the present invention is to provide a device of simple construction, capable of proper operation by those not particularly skilled in mechanics and yet by the use of which the shearing stress may be quickly and accurately determined.

Referring now more particularly to the drawing, the body of my improved shearing jig is represented generally at 4 and includes a pair of outer metal plates of identical size and construction indicated at 5 and secured together by transverse bolts 6 in such manner as to provide between them a slot 7 extending from the top to the bottom of the body. To this end, spacer plates 8 are interposed between the plates 5 of the body, being secured in assembled relation therewith by the bolts 6. The inner or adjacent ends of the filler plates 8 constitute the ends of the slot 7, and are in parallelism as shown. The slot 7 receives the plunger 10 depending from a head 11, and the slot coincides substantially with the length and the breadth of the said plunger in order that the latter may freely yet snugly slide therein transversely of the body 4. The plunger 10 has laterally disposed portions 12 which are disposed between and in flat engagement with the plates 11 of the head as shown, bolts 13 passing through the plates and the member 12 to maintain these parts in rigid connection as will be understood.

The tongue 10 is provided with a transverse opening 14 disposed preferably in the longitudinal center thereof. Similarly, the side plates 5 of the body 4 are provided with transverse openings 15, equal in diameter to the opening 14 and so located in the plates 5 as to register precisely with the opening 14 of the tongue when the latter has moved or has been slid a predetermined distance into the slot 7. The outer faces of the plates 5 are provided with countersunk portions 16 to accommodate the heads of rivets or bolts which may be inserted through the aligned openings in undergoing the test.

In operation, the jig may be laid on its side and the plunger moved within the slot to such position that its opening 14 registers or coincides with the openings 15 in the side plates 5 of the body. The assembled plates constituting the body provide a thickness or base sufficient to permit of the body standing in upright position if desired, either prior or subsequent to testing. The rivet or other device to be tested is then inserted in these aligned slots, after which the jig is placed in upright position upon the testing machine and between the upper and lower plates thereof. The plates of the testing machine, as will be understood, are then brought toward each other until the rivet has been shorn, the dials of the testing machine indicating the precise pressure required for the shear. By the double shear action thus obtained there can be no distortion of the shearing surfaces and the true measure of shearing strength of the rivet or other device is obtained. The countersunk portions in the outer faces of the side plates facilitate the ready insertion of the rivets from either side, and also permit the end of the rivet after shearing to be easily removed. The manner of testing the shear strength here proposed more truly determines the shear strength of the rivet or bolt in actual use, simulating the stresses to which the connecting element will be subjected when actually in use.

It will be understood that the openings 14—15 will coincide precisely with the diameter of the rivet or bolt to be tested, and separate jigs must be provided for each diameter of rivet or bolt to be tested.

I claim:

1. In a shear jig, a pair of plates of identical length and breadth, spacer plates interposed between said side plates, said spacer plates providing between them a slot extending entirely through said jig, bolts securing said side plates and spacer plates together, said side plates having openings extending laterally therethrough and communicating at their inner ends with the slot between said spacer plates, and a tongue slidable in said slot and having a transverse opening therein to register with the openings in said side plates.

2. In a shear jig, a body comprising a pair of side plates of identical size and construction, spacer plates interposed between said side plates, said spacer plates having their inner edges spaced apart to provide a slot disposed transversely through said body, said side plates having laterally aligned openings extending therethrough and communicating at their inner ends with said slot, the outer faces of said side plates being countersunk concentrically with said openings, a tongue corresponding in length and breadth with said slot and slidable therein, and said tongue having a lateral opening extending therethrough of a diameter corresponding to the diameter of the openings in said side plates and aligning therewith when the said tongue has been moved a predetermined distance within said slot.

3. In a shear jig, a body comprising a pair of outer side plates of identical size and construction, spacer plates interposed between said outer plates and maintaining the latter sufficiently spaced apart to provide a supporting base on one side thereof, said spacer plates having their adjacent inner edges spaced apart a distance to provide a slot disposed transversely through said body, means for securing all of said plates together, said side plates having laterally aligned openings extending therethrough and communicating at their inner ends with said slot, the outer faces of said plates being countersunk concentrically with said openings, a tongue corresponding in length and breadth with said slot and slidable therein, and said tongue having a lateral opening extending therethrough of a diameter corresponding to the diameter of the opening in said outer plates and aligning therewith when said tongue has been moved a predetermined distance within said slot.

References Cited in the file of this patent

UNITED STATES PATENTS 2,437,750     Mann ------------------ Mar. 16, 1948